United States Patent
Lim et al.

(10) Patent No.: US 10,797,504 B2
(45) Date of Patent: Oct. 6, 2020

(54) SYSTEM, METHOD AND DEVICE FOR WIRELESS POWER TRANSFER

(71) Applicant: MOTOROLA SOLUTIONS, INC., Schaumburg, IL (US)

(72) Inventors: Bing Qin Lim, Pulau Pinang (MY); Chee Kit Chan, Perak (MY); Murali Kuyimbil, Penang (MY); Wai Mun Lee, Penang (MY); Lee Sun Ooi, Kedah (MY); Ying Hooi Tan, Penang (MY); Wooi Ping Teoh, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 305 days.

(21) Appl. No.: 15/159,169

(22) Filed: May 19, 2016

(65) Prior Publication Data

US 2017/0338681 A1 Nov. 23, 2017

(51) Int. Cl.
*H02J 7/02* (2016.01)
*H02J 50/80* (2016.01)
*H02J 50/40* (2016.01)
*H02J 7/00* (2006.01)
*H02J 50/90* (2016.01)
*H02J 50/12* (2016.01)

(52) U.S. Cl.
CPC ............ *H02J 7/025* (2013.01); *H02J 7/0042* (2013.01); *H02J 7/0044* (2013.01); *H02J 50/12* (2016.02); *H02J 50/40* (2016.02); *H02J 50/80* (2016.02); *H02J 50/90* (2016.02)

(58) Field of Classification Search
None
See application file for complete search history.

(56) References Cited

U.S. PATENT DOCUMENTS

| | | | |
|---|---|---|---|
| 9,876,382 B2 * | 1/2018 | Sultenfuss | H02J 50/80 |
| 10,367,366 B2 * | 7/2019 | Wang | H02J 7/025 |
| 2004/0145343 A1 | 7/2004 | Naskali et al. | |

(Continued)

FOREIGN PATENT DOCUMENTS

GB 2491525 5/2012

OTHER PUBLICATIONS

PCT/US2017/028858 International Search Report and Written Opinion of the International Searching Authority dated Sep. 28, 2017 (16 pages).

*Primary Examiner* — Robert Grant
*Assistant Examiner* — Tynese V McDaniel
(74) *Attorney, Agent, or Firm* — Michael Best & Friedrich LLP

(57) ABSTRACT

A method and device for wireless power transfer is provided. The device includes a plurality of charging holders positioned adjacent to each other. The method includes generating a first magnetic field using a first transmit coil in a first charging holder. The method further includes generating a second magnetic field using a second transmit coil in a second charging holder positioned adjacent to the first charging holder. The method further includes magnetically coupling the first and second magnetic field to a receive coil of a portable electronic device, wherein magnetically coupling includes transferring power from the first and second magnetic field to the receive coil of the portable electronic device, the first magnetic field and the second magnetic field configured to have a synchronized phase.

16 Claims, 15 Drawing Sheets

(56) References Cited

U.S. PATENT DOCUMENTS

| | | | |
|---|---|---|---|
| 2004/0251871 A1* | 12/2004 | Dvorak | H02J 50/90 |
| | | | 320/108 |
| 2005/0156560 A1* | 7/2005 | Shimaoka | H02J 50/80 |
| | | | 320/107 |
| 2006/0087282 A1* | 4/2006 | Baarman | H02J 50/10 |
| | | | 320/108 |
| 2007/0007821 A1* | 1/2007 | Rossetti | H02J 17/00 |
| | | | 307/22 |
| 2011/0018360 A1* | 1/2011 | Baarman | H02J 7/0027 |
| | | | 307/104 |
| 2011/0062916 A1 | 3/2011 | Farahani | |
| 2012/0214536 A1* | 8/2012 | Kim | H02J 7/025 |
| | | | 455/522 |
| 2013/0005251 A1* | 1/2013 | Soar | H02J 7/025 |
| | | | 455/41.1 |
| 2014/0197785 A1* | 7/2014 | Lee | H02J 7/025 |
| | | | 320/108 |
| 2014/0368163 A1 | 12/2014 | Ho | |
| 2014/0375258 A1* | 12/2014 | Arkhipenkov | H02J 5/005 |
| | | | 320/108 |
| 2015/0084589 A1 | 3/2015 | Tsai et al. | |
| 2015/0130293 A1* | 5/2015 | Hajimiri | H02J 17/00 |
| | | | 307/104 |
| 2015/0222129 A1* | 8/2015 | McCauley | H01F 38/14 |
| | | | 307/104 |
| 2015/0222138 A1 | 8/2015 | Amano et al. | |
| 2015/0256226 A1* | 9/2015 | Lin | H04B 5/0037 |
| | | | 307/104 |
| 2015/0263565 A1 | 9/2015 | Amano et al. | |
| 2015/0326053 A1* | 11/2015 | Amano | H02J 7/00 |
| | | | 320/108 |
| 2015/0326060 A1* | 11/2015 | Young | H02J 7/0077 |
| | | | 320/108 |
| 2016/0149289 A1* | 5/2016 | Lilja | H01Q 1/526 |
| | | | 343/789 |
| 2016/0181851 A1 | 6/2016 | Porat | H02J 50/10 |
| | | | 320/108 |
| 2016/0322851 A1* | 11/2016 | Yeh | H02J 7/025 |
| 2016/0322852 A1* | 11/2016 | Yeh | H02J 7/025 |
| 2016/0372961 A1* | 12/2016 | Ritter | H01F 38/14 |
| 2017/0288471 A1* | 10/2017 | Shirani-Mehr | H02J 50/80 |

\* cited by examiner

SYSTEM, METHOD AND DEVICE FOR WIRELESS POWER TRANSFER

BACKGROUND

Battery-powered, portable electronic devices have become popular because of the ease of use they provide. Wireless power transfer systems have been implemented to recharge the batteries of such devices, even while they are in use. Wireless power transfer systems transfer electrical power, without wired connections, using inductive coupling or magnetic resonance coupling.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
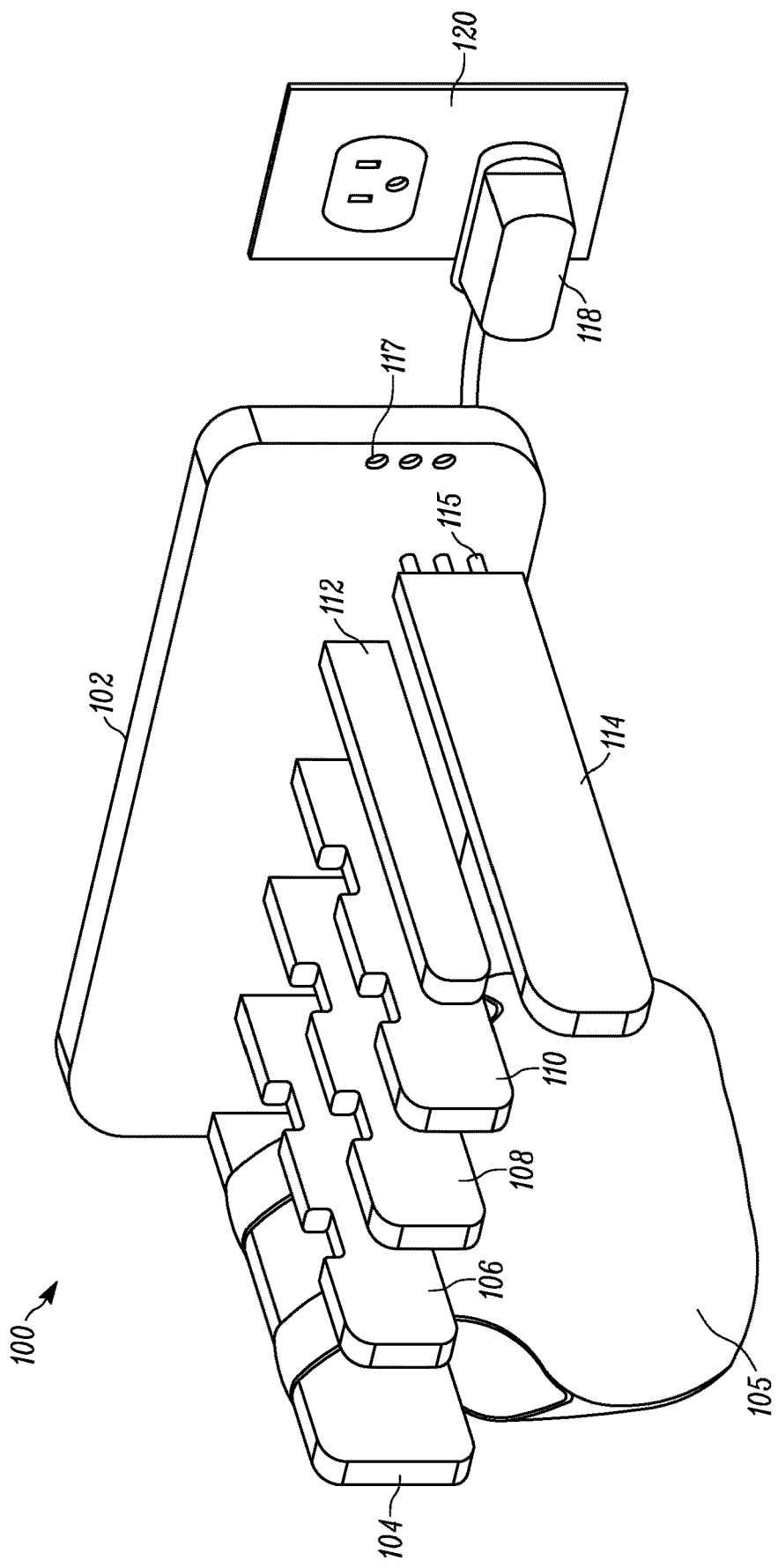
FIG. 1A is a side view of a wireless power transfer system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a wireless charging system that includes a plurality of charging holders positioned adjacent to each other. Each charging holder includes a first transmit coil configured to wirelessly transfer power, a second transmit coil positioned opposite the first transmit coil and configured to wirelessly transfer power, a shield positioned between the first transmit coil and the second transmit coil, and a sensor configured to sense a presence of a portable electronic device on an adjacent charging holder.

Another exemplary embodiment provides a method of operating a wireless charging system. The method includes generating a first magnetic field using a first transmit coil in a first charging holder; generating a second magnetic field using a second transmit coil in a second charging holder positioned adjacent to the first charging holder; and magnetically coupling the first magnetic field and the second magnetic field to a receive coil of a portable electronic device. Magnetically coupling includes transferring power from the first magnetic field and the second magnetic field to the receive coil of the portable electronic device and synchronizing a phase of the first magnetic field and a phase of the second magnetic field.

FIG. 1 is an illustration of a side view of one exemplary embodiment of a wireless power transfer system 100. The term "wireless power transfer," as used herein, refers to the wireless transfer of electrical power by the inductive coupling or magnetic resonance coupling of two or more magnetic induction coils (referred to collectively herein as "inductive coupling"). Magnetic induction coils so coupled may be referred to herein as being magnetically coupled or inductively coupled. The wireless power transfer system 100 includes wireless charging holders 104, 106, 108, 110, 112 mounted on a base unit 102 and a portable electronic device 105 placed on charging holder 104 (hereinafter referred to as occupying charging holder 104). As explained below, alternative embodiments may include different types of charging holders (such as wands, cups, poles, posts, or other components configured to hold a portable device) that can be detachably mounted on base unit 102 and different types of portable electronic devices (such as smart vests or other wearable electronic devices, etc.) or may include additional components. In FIG. 1, wireless charging holder 114 is coupled to base unit 102 using connecting pins 115 that can be inserted into socket 117 of base unit 102. Base unit 102 is coupled to a wall socket 120 via a power plug 118 to receive electric power.

Figure 1B:
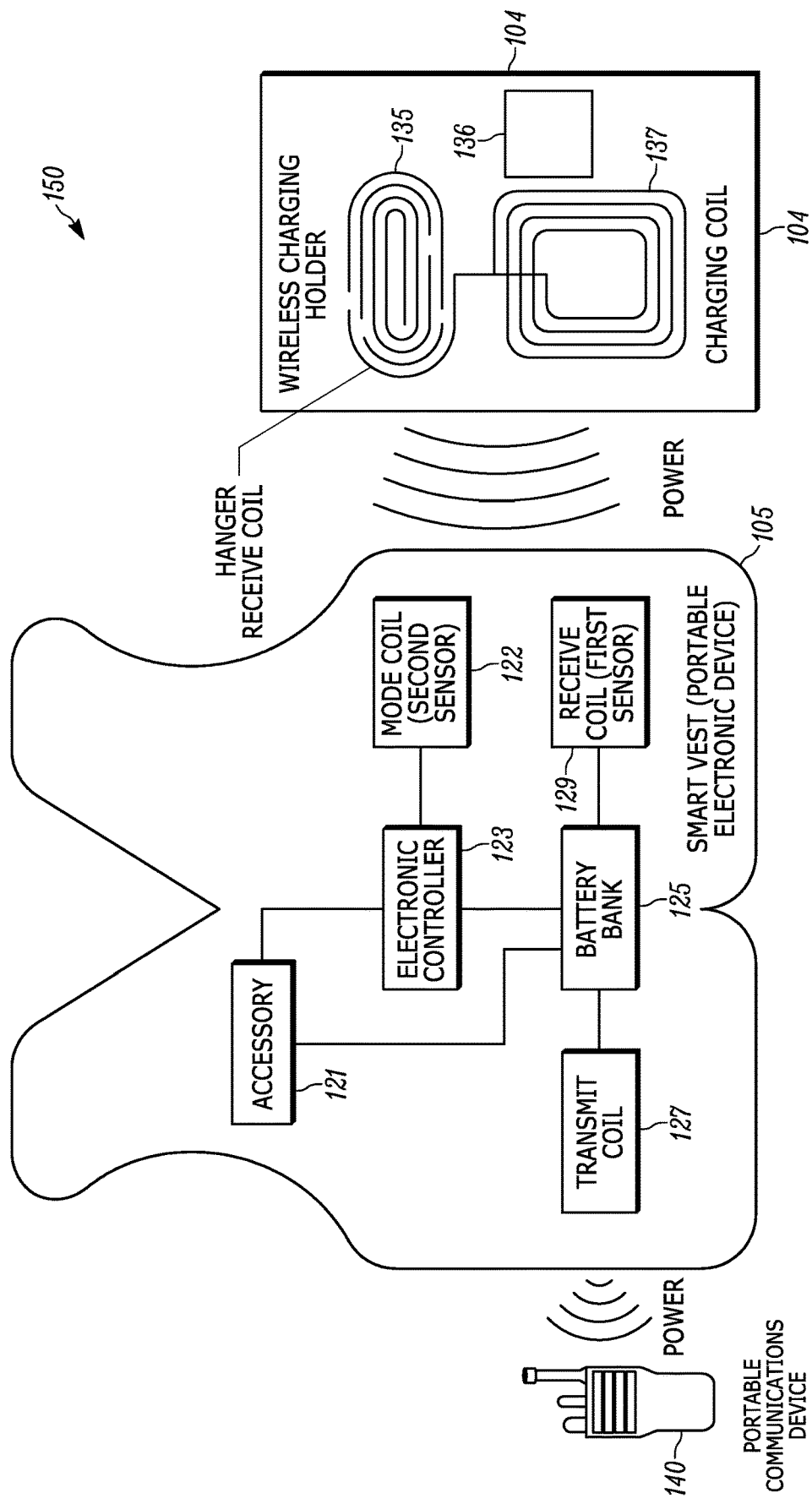
FIG. 1B is a diagram of a wireless power transfer system in accordance with some embodiments.

FIG. 1B is diagram of one exemplary embodiment of a wireless power transfer system 150. The wireless power transfer system 100 includes a wireless charging holder 104 and a portable electronic device 105. The wireless charging holder 104 includes a holder receive coil 135, a charging circuit controller 136 and a charging coil 137. The wireless charging holder 104 includes other components, described in detail below. In some embodiments, the wireless charging holder 104 may include other digital and analog components, which for brevity are not described herein and which may be implemented in hardware, software, or a combination of both, for controlling the components of the wireless charging holder 104. In some embodiments, charging circuit controller 136 provides a wireless power signal to the wireless charging coil. In another embodiment, the charging coil 137 can receive wireless power from a receive coil 135, wherein the holder receive coil 135 and charging coil 137 are magnetic induction coils electrically connected to each other. The holder receive coil 135 is configured to receive (for example, via resonant induction) a wireless power signal and transfer the wireless power signal to the charging coil 137. The wireless power signal provided to the charging coil 137 generates an alternating electrical current in the charging coil 137, which current creates a time-varying magnetic field around the charging coil 137.

Portable electronic device 105 includes a receive coil 129, a mode coil 122, an electronic controller 123, a battery bank 125, a transmit coil 127, and the accessory 127 and other various modules and components that are coupled to each other by or through one or more control or data buses that enable communication there between. The use of control and data buses for the interconnection between and exchange of information among the various modules and components would be apparent to a person skilled in the art in view of the description provided herein. In alternative embodiments, some or all of the components of the portable electronic device 105 may be communicatively coupled using suitable wireless modalities (for example, a Bluetooth® interconnection or a near field communication interconnection). Alternative embodiments may include more or fewer of each of these components, may combine some components, or may include other alternative components. The components may be integrated within the portable electronic device 105, or may be externally coupled and modular, for example, to enable the removal or addition of some of the components.

Receive coil 129 includes a magnetic induction coil capable of receiving electrical power via induction coupling to, for example, the charging coil 137 of wireless charging holder 104. When the charging coil 137 is placed in proximity to, for example, the receive coil 129 of the portable electronic device 105, the time-varying magnetic field (according to Faraday's law of induction) induces an electrical field (current) in the receive coil 129, thereby wirelessly transferring power to the portable electronic device 105. The strength of the induced field, and the thus the power transferred, decreases exponentially with the distance of the receive coil 129 from the charging coil 137. Accordingly, the receive coil 129 must be within the inductive power transfer range of the charging coil 137 for wireless power transfer to occur.

Mode coil 122 is a magnetic induction coil electrically coupled to the electronic controller 123 and operates as a sensor to sense a magnetic field. In some embodiments, the electronic controller is a microcontroller that includes an electronic processor, a memory and an input/output interface. The electronic controller 123 also includes software stored in memory (not illustrated) and executed by the electronic processor to control other components of the portable electronic device 105 as described herein.

Battery bank 125 includes one or more rechargeable batteries and other various digital and analog components and/or circuits (not shown) for receiving and supplying electrical power. Battery bank 125 operates to supply electrical power from the batteries of the battery bank 125 to the other components of the portable electronic device 105. Battery bank 125 also operates to receive electrical power from the receive coil 129 and distribute the received power to charge the batteries of the batter bank 125, operate the other components of the portable electronic device 105, or both. Battery bank 125 is controlled by the electronic controller 123 to generate a current in the transmit coil 127. In some embodiments, the transmit coil 127 is positioned within a smart vest to provide power to a body-worn electronic device, for example a portable communications device 140. Alternative embodiments of the portable electronic device 105 include multiple transmit coils capable of simultaneously wirelessly transferring power to multiple external devices using electrical power provided by the battery bank 125.

Accessory 121 is controlled by the electronic controller 113 and receives electrical power from the battery bank 125. In some embodiments, the accessory 121 may be a body-worn camera. In other embodiments, the accessory 121 may be a remote speaker microphone (RSM). In some embodiments, the accessory 121 may be a sensor or sensors, for example, accelerometers, temperature sensors, force sensors, and the like. In other embodiments, accessory 121 may be an intelligent system that includes many electronic or electro-mechanical components. Examples of intelligent systems include a health monitoring system, a body temperature control system, an integrated radio communication system, and a holster-camera alert system. For ease of description, the illustrated embodiment of the portable electronic device 105 includes a single accessory 121. Alternate embodiments of the smart vest shown in FIG. 1B include at least one accessory 121 and may include more than one or some combination of, the foregoing embodiment.

Portable electronic device 105 shown in FIG. 1B is a smart vest in the form of a garment which includes various integrated electronic components to monitor, assist, or provide communications for, the wearer. In certain embodiments described herein, the portable electronic device 105 has particular usefulness for utility, transportation, construction, manufacturing and public safety personnel. However use of portable electronic device 105 of the wireless power transfer system 150 is not limited to work-related applications. For example, person engaging in outdoor sports, such as hiking, cycling or hunting, may use an embodiment of the portable electronic device 105 that includes integrated electronic components to assist specifically for those activities. Accordingly, the systems and methods described herein are not limited in their application to smart vests. Alternative embodiments may include other types of smart garments (for example, a smart utility belt) and non-garment portable electronic devices (for example, portable radios and portable telephones).

Figure 2:
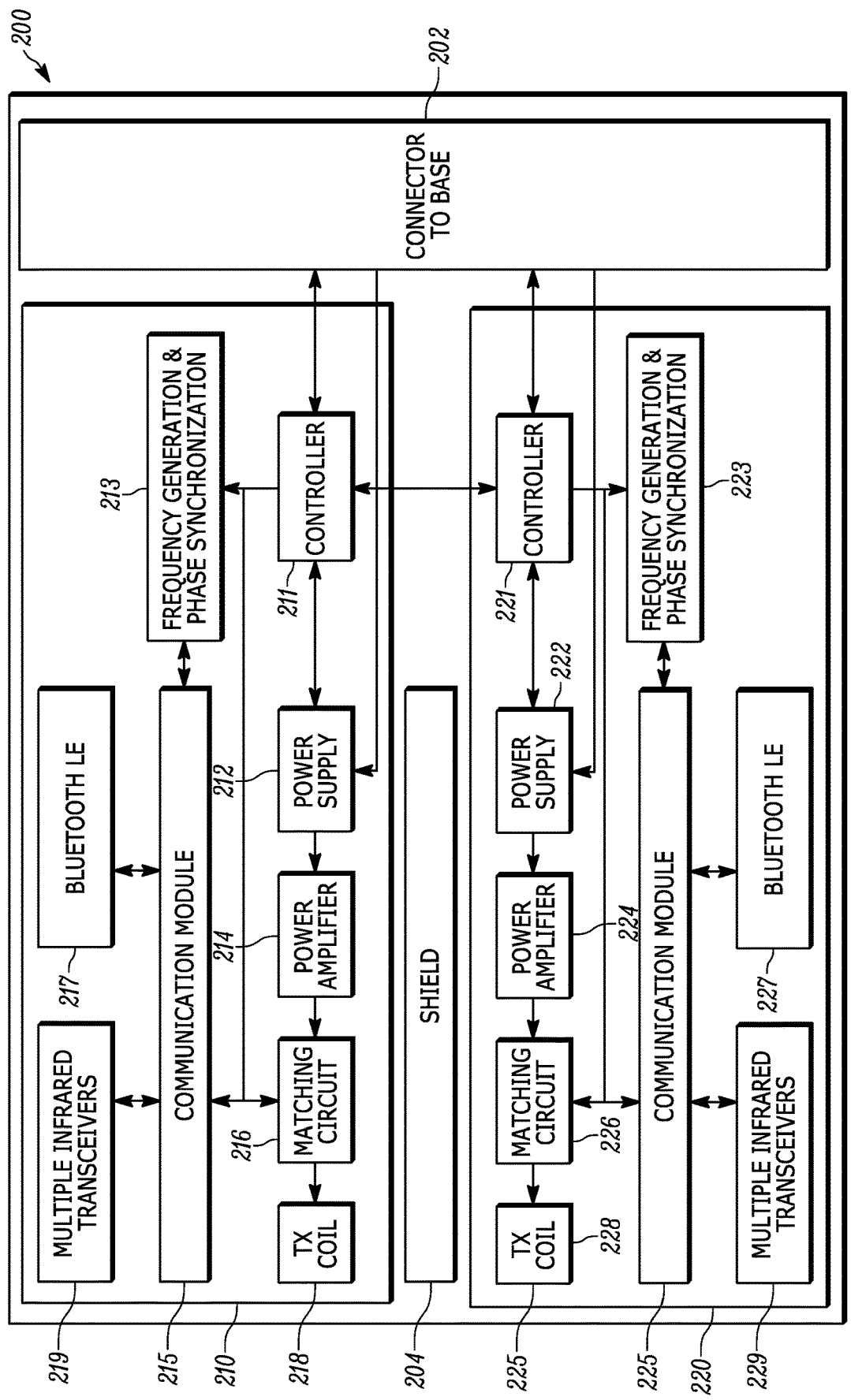
FIG. 2 is a diagram a charging holder in accordance with some embodiments.

FIG. 2 is a diagram of an exemplary embodiment of a charging holder 200. The charging holder 200 includes transmit modules 210 and 220, a shield 204 and a base connector 202. Transmit module 210 includes a controller 211, a power supply 212, a power amplifier 214, a matching circuit 216, a transmit coil 218, a frequency generation and phase synchronization circuit 213, a near field module (e.g., Bluetooth® LE) module 217, one or more infrared transceivers 219 and a communication module 215 that are coupled to each other by or through one or more control or data buses that enable communication there between. The use of control and data buses for the interconnection between and exchange of information among the various modules and components would be apparent to a person skilled in the art in view of the description provided herein. Power supply 212 receives electrical power from a base unit via a connector 202.

In the example illustrated, transmit module 220 includes a controller 221, a power supply 222, a power amplifier 224, a matching circuit 226, a transmit coil 228, a frequency generation and phase synchronization circuit 223, a Bluetooth® LE module 227, one or more infrared transceiver based phase synchronization circuit 229 and a communication circuit 225 that are coupled to each other by or through one or more control or data buses that enable communication there between. The use of control and data buses for the interconnection between and exchange of information among the various modules and components would be apparent to a person skilled in the art in view of the description provided herein. Power supply 222 is configured to receive electrical power via a connector 202.

Transmit modules 210 and 220 are positioned such that the transmit coil 218 and transmit coil 228 are opposite from one another insulated from each other using shield 204. In some embodiments, the one or more infrared transceiver based phase synchronization circuit 229 are arranged on a side surface of charging holder 200 such that they face an adjacent charge holder.

Figure 3:
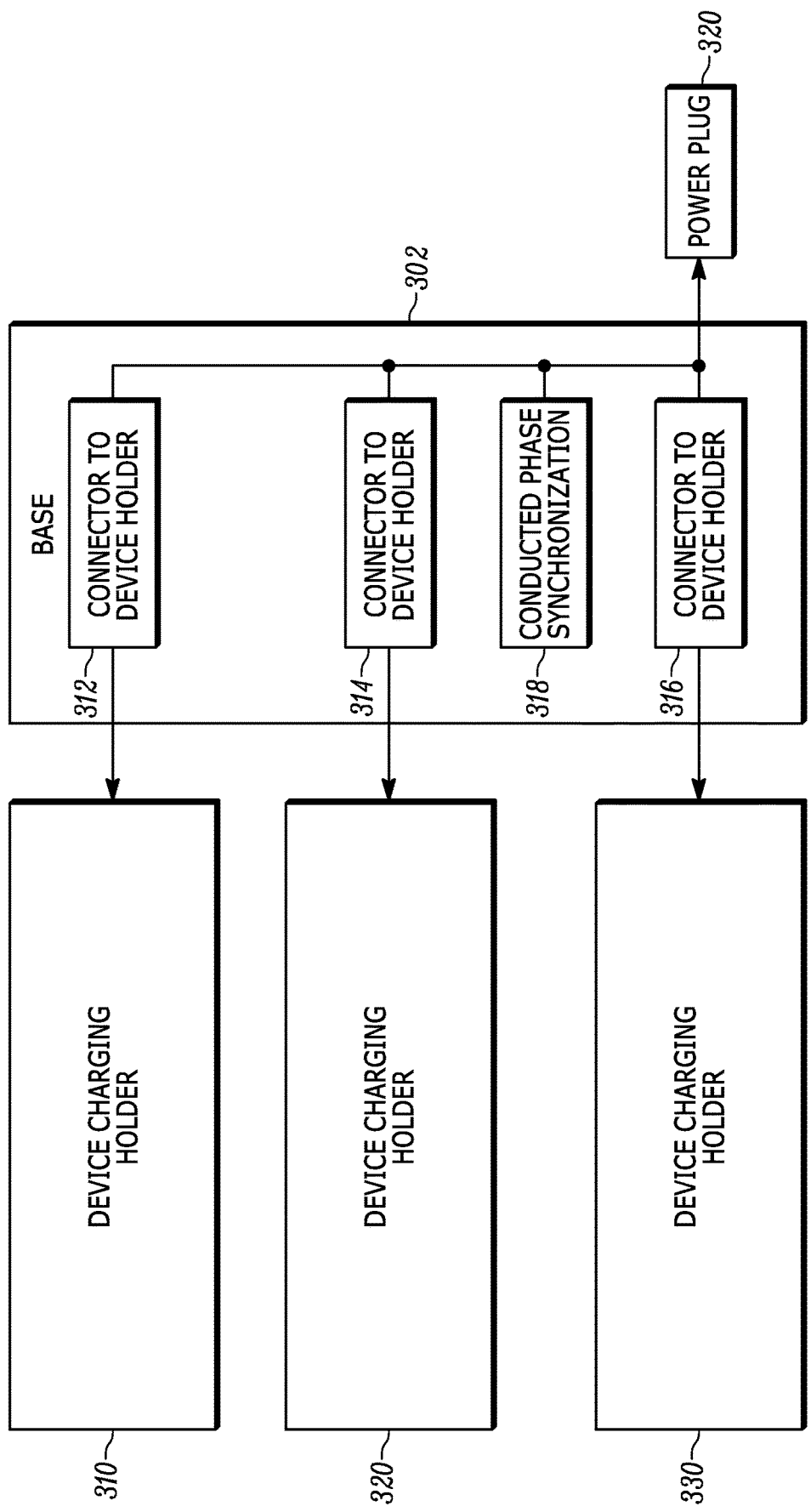
FIG. 3 is a diagram of a base unit coupled to charging holders in accordance with some embodiments.

FIG. 3 is a diagram of an exemplary embodiment showing a base unit 302 coupled to charging holders 310, 320, and 330. Base unit 302 includes phase synchronization circuit 318 and charging holder connectors 312, 314, and 316. Charging holder connectors 312, 314 and 316 provide connection to charging holders 310, 320 and 330, respectively. Base unit 302 is coupled to power plug 320 to receive electrical power for the wireless charging system 100. Conducted phase synchronization circuit 318 and the infrared transceiver based phase synchronization circuit 229 can be either coexist to provide flexibility of either using conducted or wireless phase synchronization method in the wireless charging system, or only either conducted phase synchronization circuit 318 alone or the infrared transceivers based phase synchronization circuit 229 alone exist in the wireless charging system.

Figure 4:
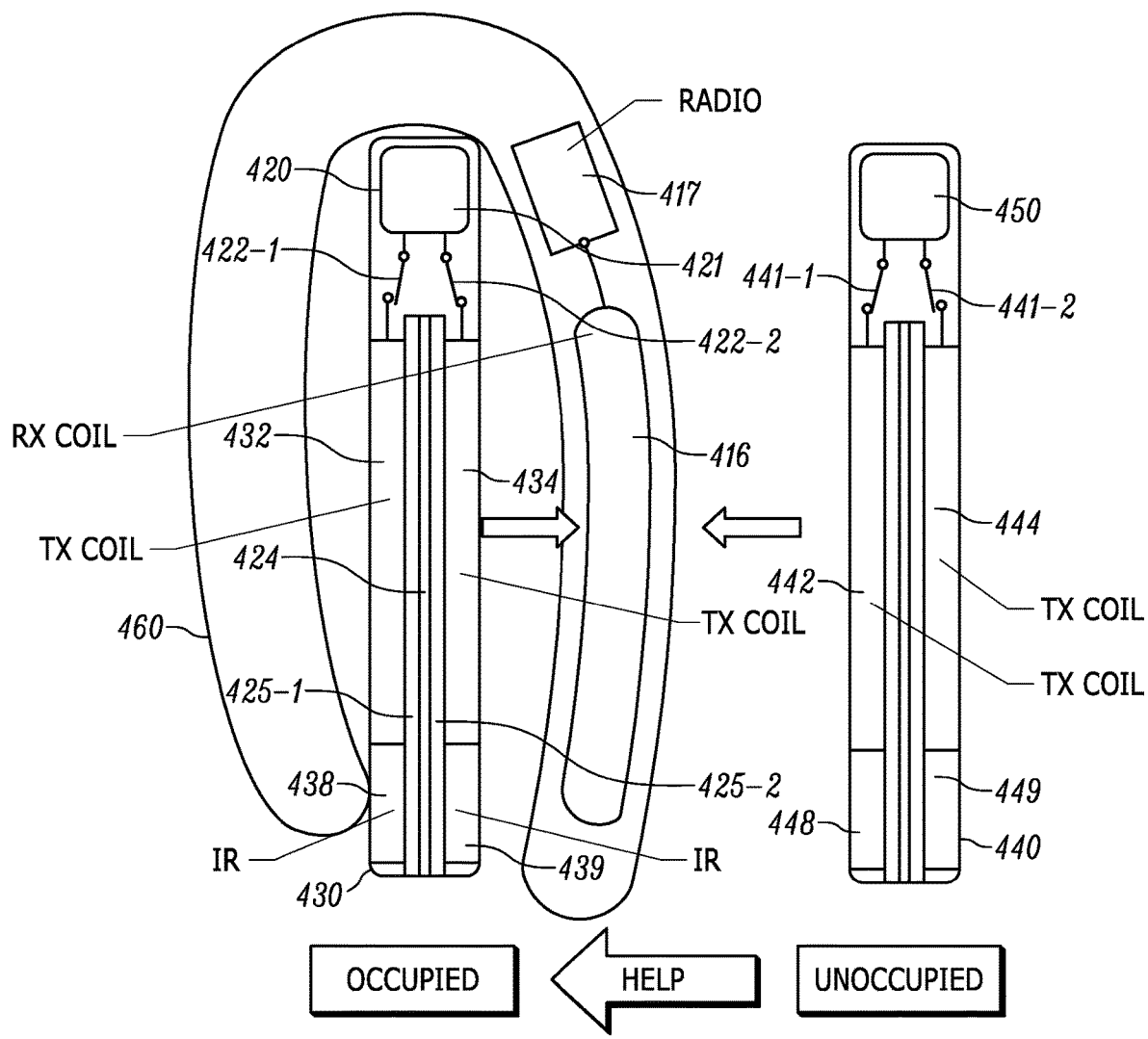
FIG. 4 illustrates an occupied charging holder and an unoccupied charging holder charging a portable electronic device in accordance with some embodiments.

FIG. 4 illustrates an exemplary embodiment of an occupied charging holder 430 and an unoccupied charging holder 440 charging a portable electronic device 460. Occupied charging holder 430 includes infrared (IR) transceivers 438 and 439, transmit coil 432 and transmit coil 434 positioned opposite the transmit coil 432. A shield 424 is positioned between the transmit coils 432 and 434. The charging holder 430 also includes controller 420, and switches 422-1 and 422-2. Controller 420 controls operation of switches 422-1 and 422-2 that in turn controls the flow of electrical power into transmit coils 432 and 434, respectively. Similarly, controller 450 controls operation of switches 441-1 and 441-2 that in turn controls the flow of electrical power into transmit coils 442 and 444, respectively. In some embodiments, portable electronic device 460 includes a receive coil 416 coupled to a radio circuit 427. In other embodiments, portable electronic device 460 would include further components as described elsewhere in this document.

In some embodiments, when portable electronic device 460 is placed on charging holder 430, controllers 420 and 450 turn on switches 422-2 and 441-1 respectively such that transmitter coils 434 and 442 receive electric power and begin wireless power transfer to receive coil 416. In some embodiments, infrared transceivers 438 and 439 are configured as a sensor to determine if a portable electronic device 460 is placed on charging holder 430. In other embodiments, infrared transceivers 439 and 448 are configured as sensors to determine the distance between transmitter coils 434 or 442 and portable electronic device 460. In some embodiments, infrared transceivers 439 and 448 include a phase synchronization circuit configured to generate a phase synchronization signal used for matching (or synchronizing) the phase of signals generated by transmit coils 434 and 442.

Figure 5:
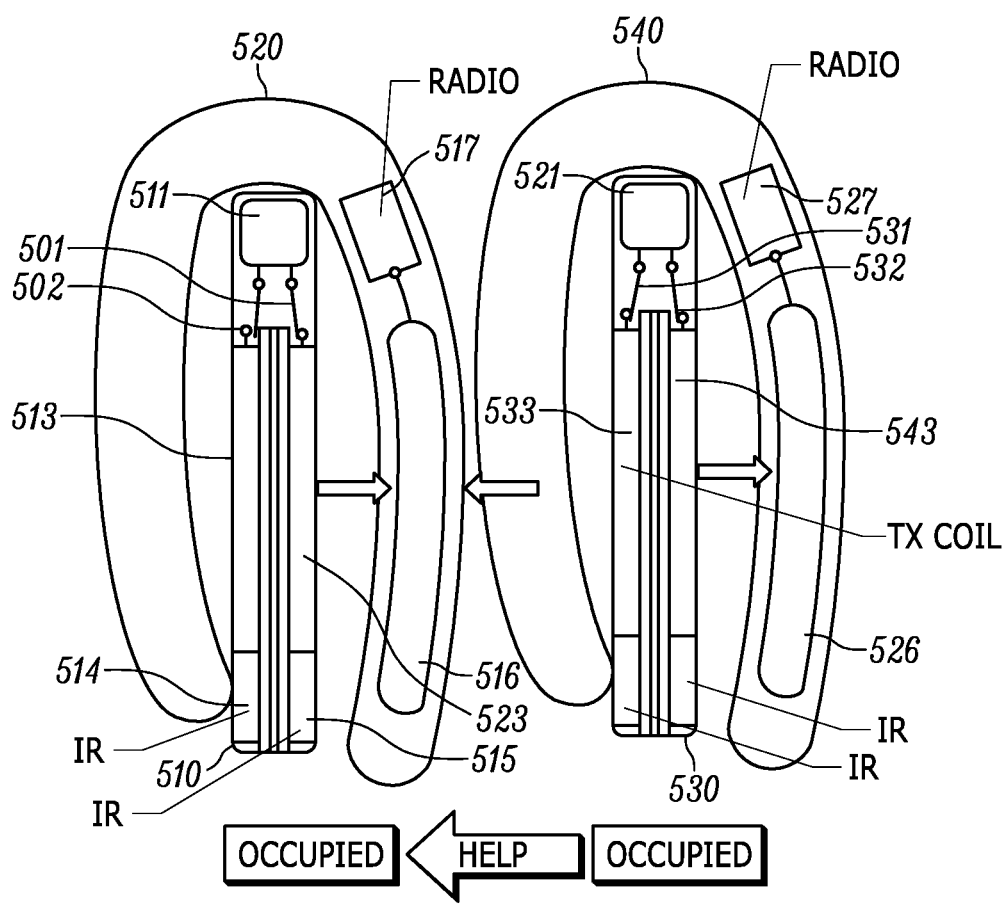
FIG. 5 illustrates two adjacent occupied charging holders charging a portable electronic device in accordance with some embodiments.

FIG. 5 illustrates an exemplary embodiment having two adjacent occupied charging holders 510 and 530 charging a portable electronic 520. Occupied charging holder 510 includes infrared (IR) transceivers 514 and 515, transmit coils 513 and 523, controller 511, switch 501 and switch 502, and a shield to insulate the transmit coils 512 and 523 from each other. Similarly, occupied charging holder 530 includes infrared transceivers, controller 521, switch 531 and switch 532, and a shield to insulate the transmit coils 533 and 543 from each other.

In some embodiments, when portable electronic device 520 is placed on charging holder 510 and a similar portable electronic device 540 is placed on an adjacent charging holder 530 controllers 511 and 521 are configured to route electric power through appropriate switches to enable efficient wireless power transfer to receiver coils 516 and 526. In particular, controller 511 turns on switch 501 to feed transmitter coil 523 an electric current capable of generating a magnetic field that enables wireless power transfer to receiver coil 516. Similarly switch 531 is turned on by controller 521 to feed transmitter coil 533 an electric current capable of generating a magnetic field that enables wireless power transfer to receiver coil 516. In addition, controller 521 turns on switch 532 that enables flow of electric current into transmit coil 526 that in turn wirelessly transfers power to receiver coil 526 of portable electronic device 540.

Figure 6:
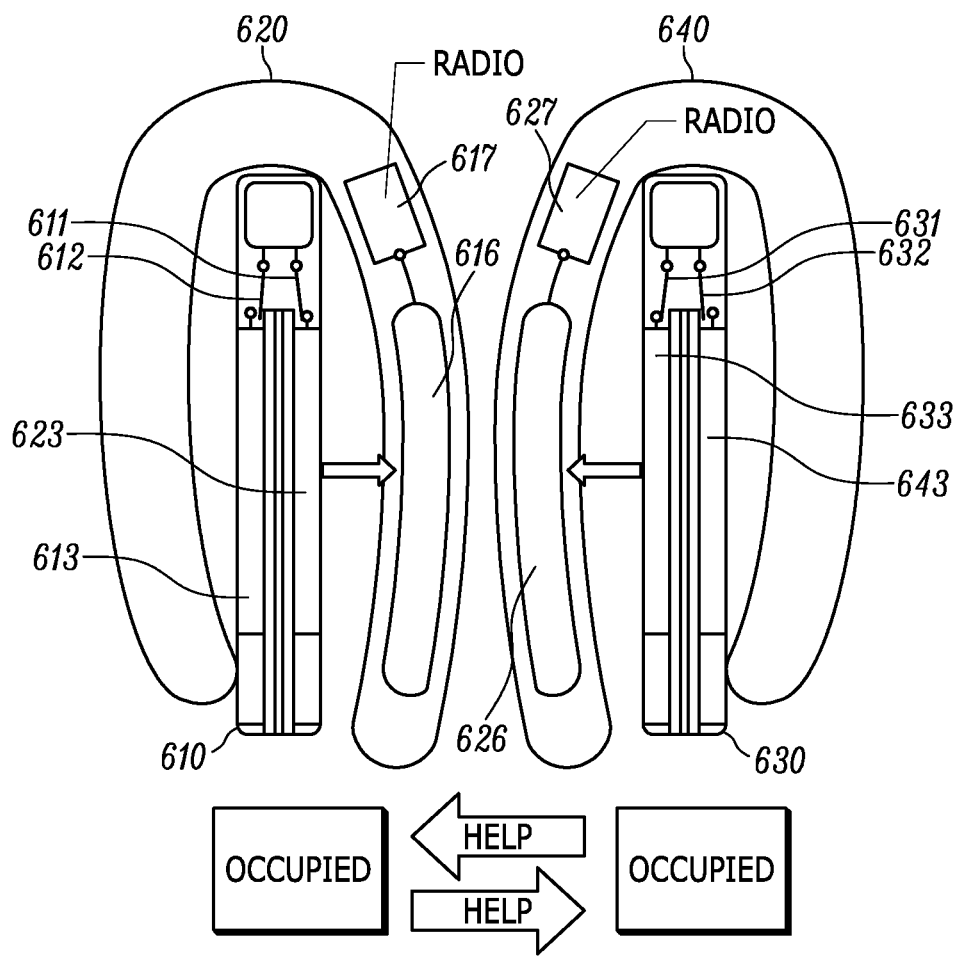
FIG. 6 illustrates charging of two portable electronic devices placed on adjacent charging holders in accordance with some embodiments.

FIG. 6 is an exemplary embodiment showing a charging configuration having two portable electronic devices 620 and 640 each placed on adjacent charging holders 610 and 630 in accordance with some embodiments. In operation, switch 612 within charging holder 610 is turned on by a controller in charging holder 610 to enable transmit coil 623 to wirelessly transfer power to receive coil 616 of portable electronic device 620. Similarly, switch 631 within charging holder 630 is turned on by a controller in charging holder 630 to enable transmit coil 633 to wirelessly transfer power to receive coil 626 of portable electronic device 640.

Figure 7:
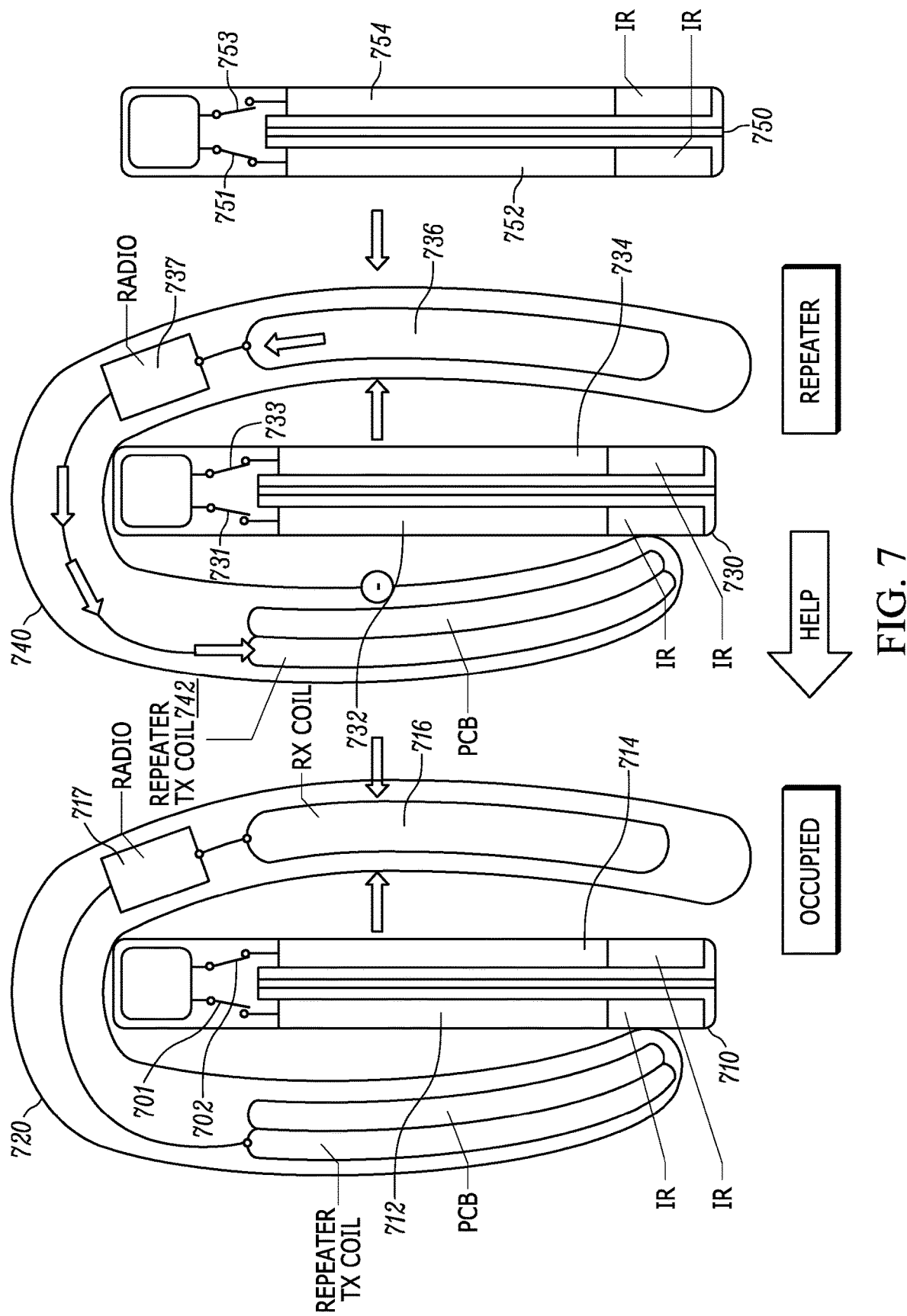
FIG. 7 illustrates charging a portable electronic device using a repeater configuration in accordance with some embodiments.

FIG. 7 is an exemplary embodiment showing charging of a portable electronic device 720 using a repeater configuration. Portable electronic devices 720 and 740 occupy two adjacent charging holders 710 and 730, respectively and charging holder 750 is unoccupied. Transmit coil 752 of charging holder 750 receives electric current when switch 751 in charging holder 750 is turned on by a controller in charging holder 750. Transmit coil 734 of charging holder 730 receives electric current when switch 733 in charging holder 730 is turned on by a controller in charging holder 730. Upon receiving electric current at transmit coils 734 and 752, they begin to wirelessly transfer power to receive coil 736 of charging holder 730. In some embodiments, portable electronic device 740 includes a radio circuit 737 and a repeater transmit coil 742. In one embodiment, a portion of the power received by receiver coil 736 is coupled to repeater transmit coil 742 that is coupled to radio 737.

In some embodiments, repeater transmit coil 742 is utilized to wirelessly transfer power to adjacent receiver coil 716. In other embodiment, receiver coil 716 is configured to simultaneously receive power wirelessly transferred from transmit coil 714 within charging holder 710 and repeater coil 742. This is enabled by having switch 702 in charging holder 710 and switch 731 in charging holder 730 simultaneously turned on by controllers within respective charging holders.

Figure 8:
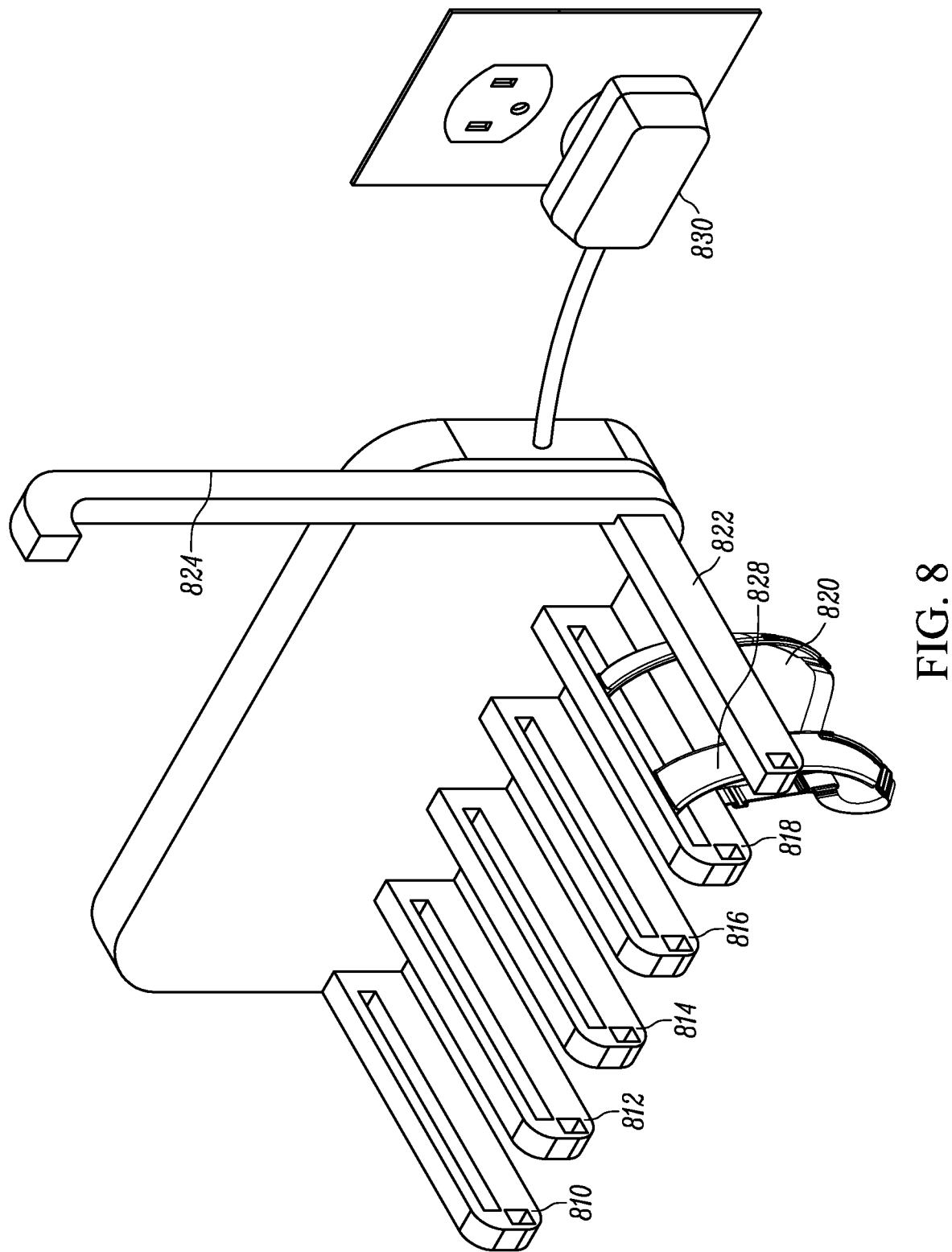
FIG. 8 illustrates a locking mechanism for a charging holder in accordance with some embodiments.

FIG. 8 is an exemplary embodiment showing a locking mechanism for a portable electronic device 820 that is placed on charging holder 818. The wireless charging system shown in FIG. 8 includes charging holders 810, 812, 814, 816, 818 and 822. In one embodiment, charging holder 822 includes an upper arm 824 and a lower arm 822 that are designed such that they will come to a locking position in when the upper arm 824 is moved down towards lower arm 822. In some embodiments a mechanical mechanism (for example, a latch) for securing the portable electronic device may be used. In other embodiments an electrically operated locking mechanism may be used to secure the portable electronic device 820.

Figure 9A:
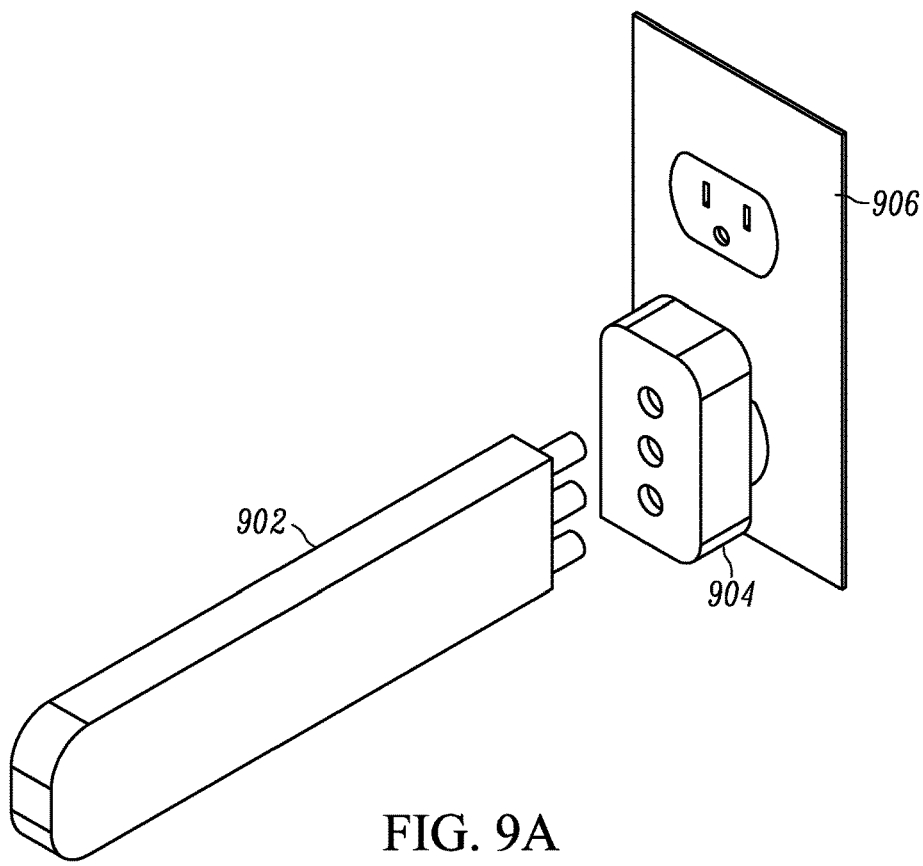
FIG. 9A illustrates a charging holder unplugged from a power plug interface in accordance with some embodiments.

FIG. 9A illustrates a charging holder 902 unplugged from a power socket 904 in accordance with some embodiments. Power socket 904 is adapted to plug into a wall power outlet 906.

Figure 9B:
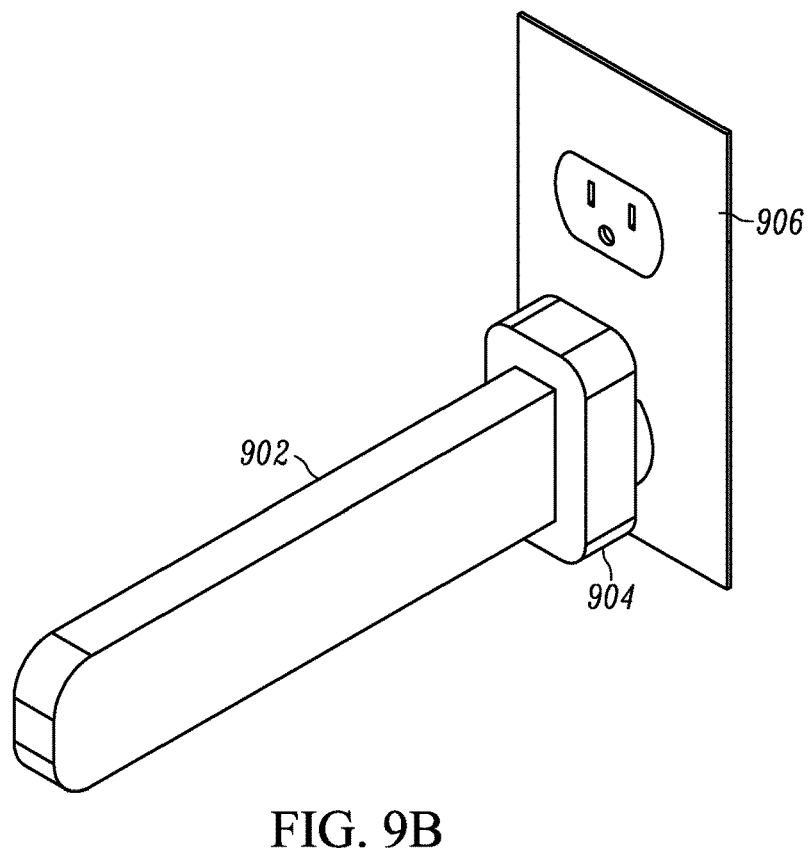
FIG. 9B illustrates a charging holder plugged into a power plug interface in accordance with some embodiments.
Figure 10:
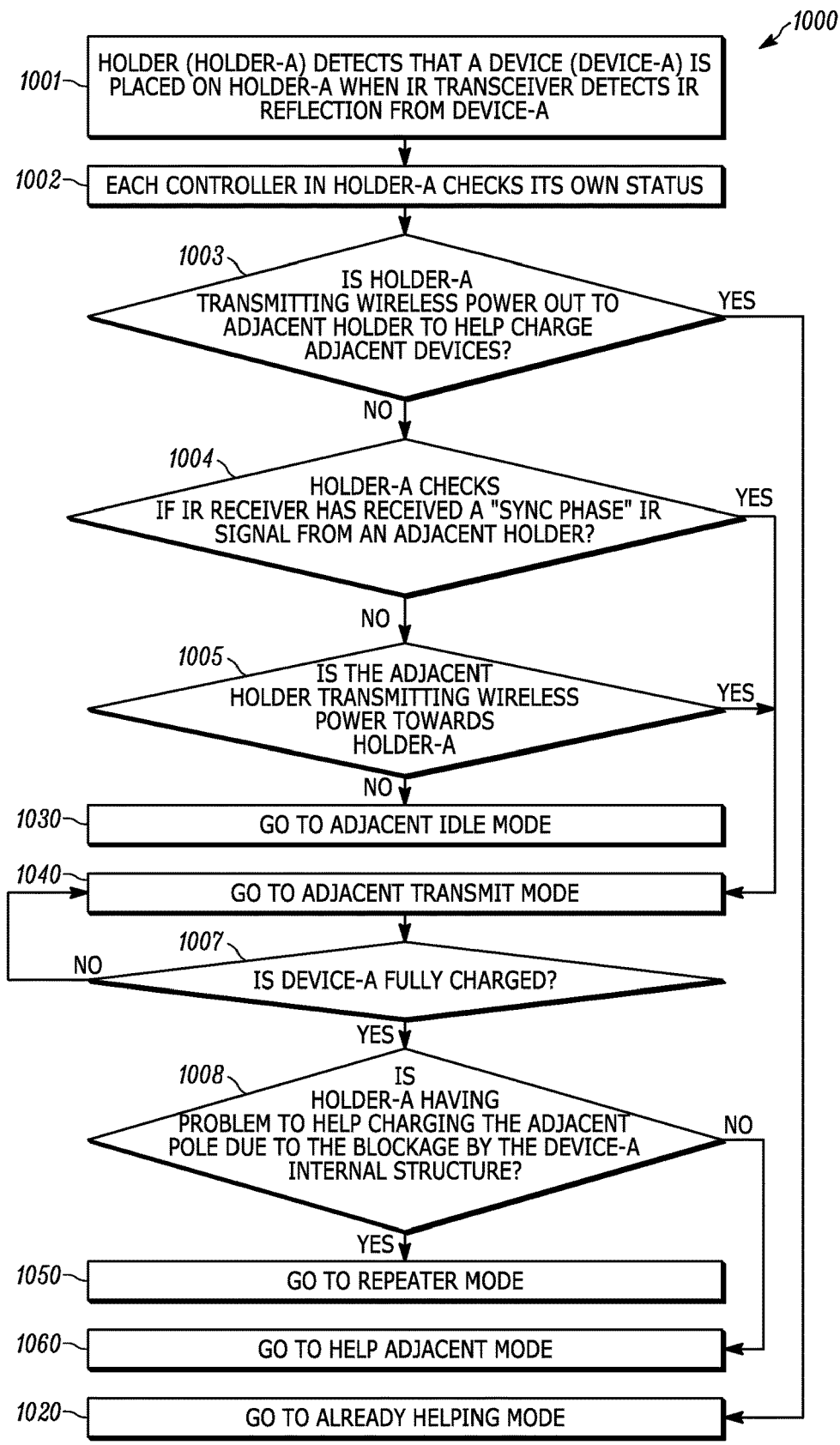
FIG. 10 through FIG. 14 illustrates a flow chart of a method of operating a wireless power transfer system of FIG. 1 in accordance with some embodiments.
Figure 11:
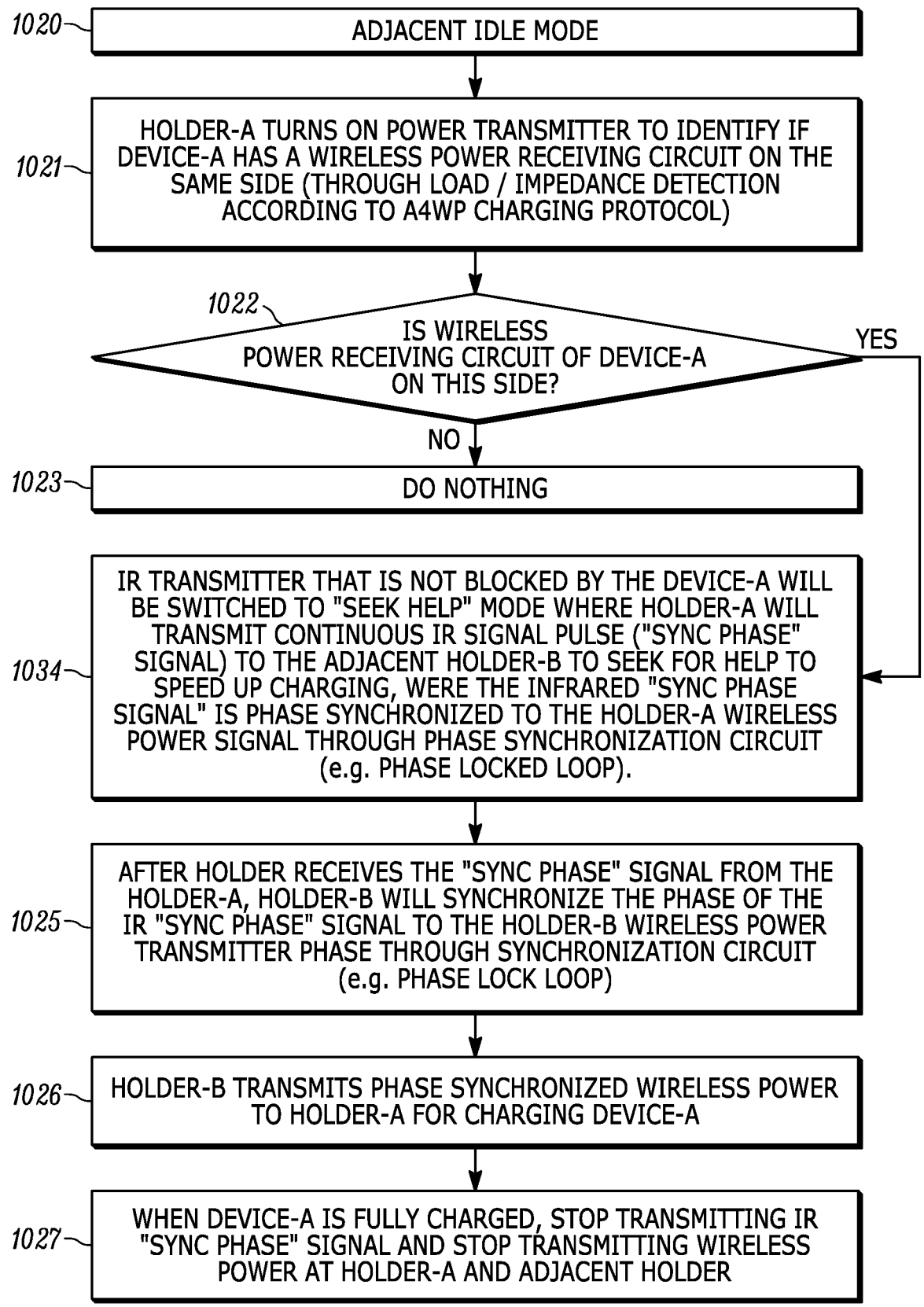
Figure 12:
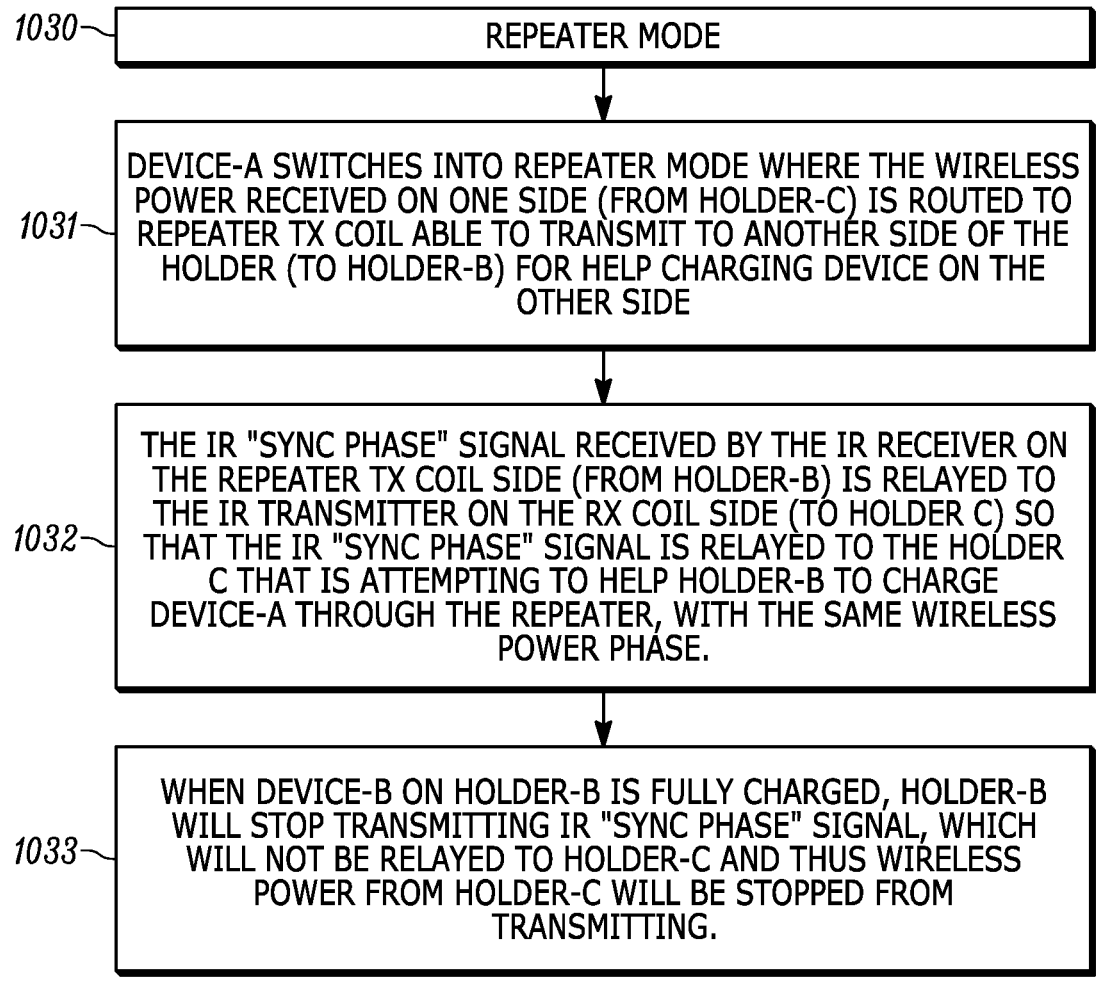
Figure 13:
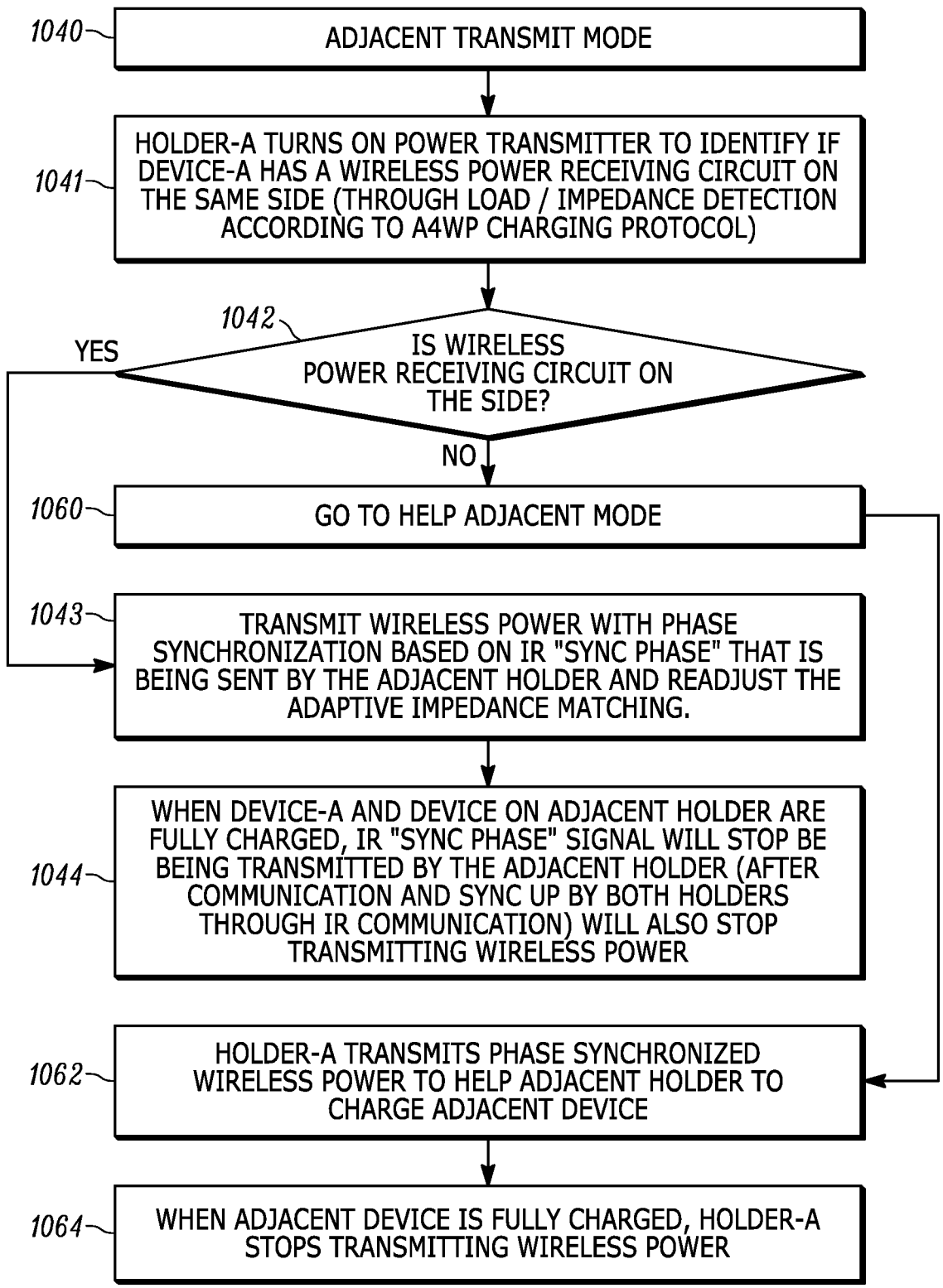
Figure 14:
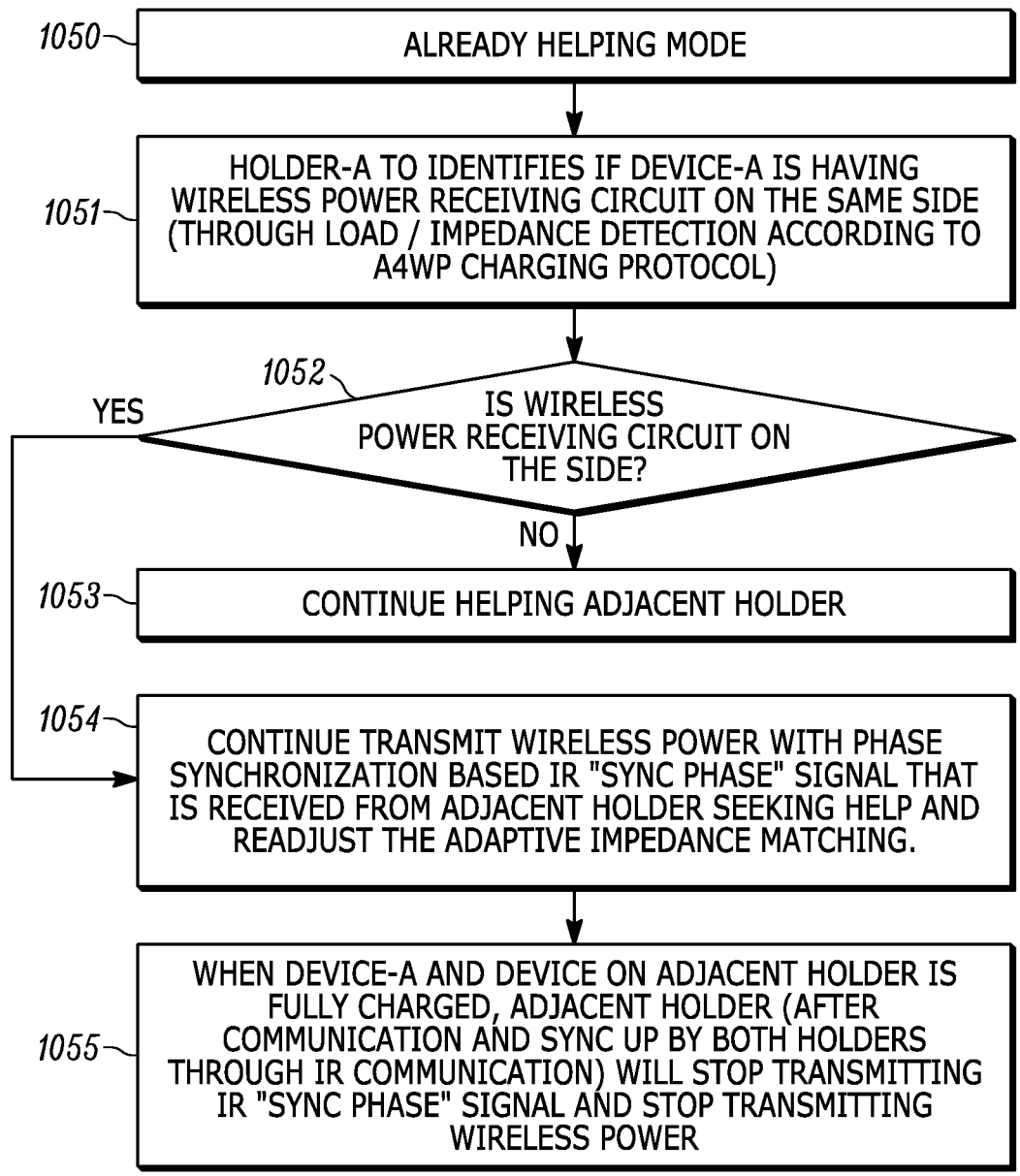

FIG. 9B illustrates a charging holder 902 plugged into the power socket 904 in accordance with some embodiments.

FIG. 10 through FIG. 14 illustrates a method 1000 for operating the wireless power transfer system 100 in accordance with some embodiments. The method 1000 may be carried out by, for example, with controller 211 and/or controller 221, for example, executing software designed to implement all or part of the method 1000. The method steps described hereinafter is provided with the understanding that Device A may be any one of the portable electronic devices 105, 460, 520, 540, 620, 640, 720 and 740. Similarly, Holder A described hereinafter is provided with the understanding that it may be any one of the charging holders 104, 106, 108, 110, 112, 114, 310, 230, 330, 430, 440, 510, 530, 610, 630, 710, 730, 750, 810, 812, 814, 816, 818, and 822.

At block 1001 (FIG. 10), charging holder (Holder A) detects that a portable electronic device (Device A) is placed on the charging holder when an infrared transceiver within Holder A detects an infrared reflection caused by Device A.

At block 1002, each controller within Holder A checks its own status.

At block 1003, method 1000 checks whether Holder A is transmitting wireless power to an adjacent charging holder to help charge adjacent portable electronic devices. When Holder A is transmitting power towards or to an adjacent charging holder then method 1000 progresses to block 1020, where the applicable controller is placed in an "already helping mode." On the other hand, when Holder A is not transmitting power towards or to an adjacent charging holder then method 1000 progresses to block 1004.

At block 1004, Holder A checks whether infrared receiver has received any "SYNC PHASE" infrared signals or, more broadly, synchronization signals from an adjacent holder. When Holder A detects a "SYNC PHASE" infrared signal at infrared receiver, method 1000 progresses to block 1040, where the applicable controller enters an "adjacent transmit mode." When Holder A does not detect a "SYNC PHASE" infrared signal at infrared receiver, the method progresses to block 1020, where the applicable controller enters an "adjacent idle mode."

At block 1005, method 1000 determines whether the adjacent holder is transmitting wireless power towards or to Holder A. When Holder A is receiving wireless power from an adjacent holder then method 1000 progresses to block 1040, where the applicable controller enters an "adjacent transmit mode." When Holder A is not receiving wireless power from adjacent holder then method 1000 progresses to block 1030 (FIG. 11), where the applicable controller enters an "adjacent idle mode."

At block 1007, the applicable controller determines when Device A is fully charged. When Device A is not fully charged then method 1000 returns to block 1040, where the applicable controller is placed or maintained in the "adjacent transmit mode." When Device A is fully charged then method 1000 progresses to block 1008.

At block 1008, the applicable controller determines whether Holder A is having a problem in helping or assisting with charging the device on the adjacent holder due to a blockage or interference by Device A's internal structure. When it is determined that Holder A is having a problem in helping to charge the adjacent device then applicable controlled is placed in a "repeater mode" (block 1030 (FIG. 12)). On the other hand, when it is determined that Holder A is not experiencing a problem in assisting with charging the adjacent device, then the applicable controller enters into a "help adjacent mode" (block 1060 (FIG. 13)).

At block 1020 (FIG. 11), the applicable controller enters the "adjacent idle mode."

At block 1021, Holder A turns on a transmitter coil that resides within Holder A to determine whether Device A has a wireless power receiving circuit on the same side as the transmitter coil. This determination may be made, for example, through the use of load/impedance detection according to the A4WP charging protocol or another similarly capable protocol.

At block 1022, the applicable controller determines whether the wireless power receiving circuit of Device A is on the same side of the power transmitter. When it is on the same side then method 1000 progresses to block 1024. When Device A is not on the same side of power transmitter then method 1000 stops at block 1022.

At block 1024, the infrared transmitter that is not blocked by Device A will be switched to "SEEK HELP" mode where Holder A provides or transmits continuous infrared signal pulses ("SYNC PHASE" signal) to an adjacent Holder B to seek help to speed up charging, were the infrared "SYNC PHASE" signal is phase synchronized to the Holder A wireless power signal through phase synchronization circuit (for example, phase locked loop (PLL)).

At block 1025, after Holder B receives the "SYNC PHASE" signal from Holder A, Holder B will synchronize the phase of the infrared "SYNC PHASE" signal to the Holder B wireless power transmitter phase through synchronization circuit (for example, phase locked loop).

At block 1026, Holder B transmits phase synchronized wireless power to help Holder A to charge Device A.

At block 1027, when Device A is fully charged, infrared transmission of "SYNC PHASE" beacon is stopped and both Holder A and the adjacent holder stop transmitting wireless power.

At block 1030 (FIG. 12), method 1000 enters a Repeater Mode.

At block 1031, Device A switches into repeater mode where the wireless power received on one side (from Holder C) is routed to the repeater transmit coil to be able to transmit to another side of the holder (to Holder B) to help charging device on the other side.

At block 1032, the infrared "SYNC PHASE" signal received by the infrared receiver on the repeater transmit coil side (from holder B) will be relayed to the infrared transmitter on the receiver coil side (to Holder C) so that the infrared "SYNC PHASE" signal can be relayed to the Holder C that is attempting to help Holder B to charge Device B through the repeater with the same wireless power phase.

At block 1033, when Device B on Holder B is fully charged, Holder B will stop transmitting out infrared "SYNC PHASE" signal and thus will not be relayed to Holder C and thus wireless power from Holder C will be stopped from transmitting out.

At block 1040 (FIG. 13), method 1000 enters an Adjacent Transmit Mode.

At block 1041 and 1042, Holder A turns on a transmitter coil within Holder A to identify whether device A has a wireless power receiving circuit on the same side of the transmitter coil. This is performed using load/impedance detection according to the A4WP charging protocol or similarly capable protocol that may be available in future. When it is determined that the wireless power receiving circuit is not on the same side as the transmitter coil then method 1000 progresses to a Help Adjacent Mode (block 1060) which continues to block 1062. When it is determined that the wireless power receiving circuit is on the same side of the transmitter coil then method 1000 progresses to block 1043.

At block 1043, wireless power is transmitted with phase synchronization based on infrared "SYNC PHASE" signal. This signal is sent out by the Adjacent Charging holder and is used to readjust an adaptive impedance matching.

At block 1044, infrared "SYNC PHASE" signal will be stopped from being transmitted by the Adjacent Charging Holder when both Device A and the device on the Adjacent Holder are fully charged. This occurs after both charging holders communicate through infrared communication and stop transmitting wireless power.

At block 1062, Holder A will transmit out phase synchronized wireless power to help Adjacent Charging Holder to charge an Adjacent Device.

At block 1064, when Adjacent Device is fully charged, wireless transmission of power is stopped.

At block 1050 (FIG. 14), method 1000 enters an Already Helping Mode.

At block 1051 and block 1052, Holder A will identify whether Device A has a wireless power receiving circuit on the same side (through load/impedance detection according to Alliance for Wireless Power (A4WP) charging protocol or similarly capable protocol that may be available in future). When the wireless power receiving circuit is on the same side then method 1000 progresses to block 1024. When the wireless power receiving circuit is not on the same side the method 1000 continues to help the adjacent charging holder (block 1053).

At block 1054, method 1000 continues to transmit wireless power with phase synchronization based on IT "SYNC PHASE" signal that received from the adjacent charging holder that is seeking for help and also to readjust the adaptive impedance matching.

At block 1055, infrared "SYNC PHASE" signal will be stopped from being transmitted when Device A and a device on adjacent charging holder is fully charged. This step occurs soon after both holders synchronize each other's status using infrared communication.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A wireless charging system comprising:
a plurality of charging holders positioned adjacent to each other; each charging holder including:
a first transmit coil positioned on a first side of a shield and configured to generate a first magnetic field to wirelessly transfer power,
a second transmit coil positioned on an opposite side of the shield and configured to generate a second magnetic field to wirelessly transfer power to a portable electronic device on an adjacent charging holder,
wherein the first magnetic field and second magnetic field are transmitted in a direction away from the shield,
a sensor configured to sense a presence of the portable electronic device on an adjacent charging holder.

2. The wireless charging system of claim 1, further comprising a base unit, wherein the plurality of charging holders are detachably mounted to the base unit.

3. The wireless charging system of claim 2, wherein the base unit includes a connector unit configured to electrically couple the charging holder to a power supply.

4. The wireless charging system of claim 3, wherein the connector unit generates a reference frequency signal adapted for phase synchronization, the reference frequency signal provided to a first and second wireless transmit power phase synchronization circuit to generate wireless transmit power for first and second transmit coils.

5. The wireless charging system of claim 1, wherein the plurality of charging holders comprise one selected from the group consisting of either or combination of a wand, a cup, and a post, configured to hold a plurality of portable devices on the charging holder.

6. The wireless charging system of claim 1, wherein the sensor comprises one or more infrared transceiver.

7. The wireless charging system of claim 6 including:
a first infrared transceiver configured to transmit and receive an infrared signal when a portable device is placed on the charging holder, and a second infrared transceiver configured to transmit a phase synchronization signal to a first adjacent charging holder.

8. The wireless charging system of claim 7, wherein the adjacent charging holder is configured to transmit a wireless power signal having a phase substantially similar to the phase of the phase synchronization signal.

9. The wireless charging system of claim 7 further comprising:
a phase lock loop (PLL) configured to generate the wireless power signal having a phase substantially similar to the phase of the phase synchronization signal.

10. The wireless charging system of claim 1 further comprising:
a locking mechanism to secure a portable electronic device on the charging holder.

11. The wireless charging system of claim 1, wherein the sensor is configured to communicate with at least one of the adjacent charging holders.

12. The wireless charging system of claim 11, wherein the sensor communicates with the adjacent charging holder using Alliance For Wireless Power (A4WP) protocol.

13. A method of operating a wireless charging system, the method comprising:
generating, with a first transmit coil positioned on a first side of a shield in a first charging holder, a first magnetic field;
generating, with a second transmit coil positioned on an opposite side of the shield in the first charging holder, a second magnetic field,
wherein the first magnetic field and second magnetic field are transmitted in a direction away from the shield;
magnetically coupling the first magnetic field to a first receive coil of a first portable electronic device when the first portable electronic device is received by the first charging holder and magnetically coupling the second magnetic field to a second receive coil of a second portable electronic device when the second portable electronic device is received by a second charging holder positioned adjacent to the first charging holder,
wherein magnetically coupling includes transferring power to the first receive coil of a first portable electronic device and the second receive coil of the second portable electronic device;
sensing, by a sensor, the presence of the second portable electronic device on the second charging holder positioned adjacent to the first charging holder.

14. The method of claim 13, further comprising:
providing a phase synchronization signal to one or more adjacent charging holder, wherein the phase synchronization signal provides a reference signal to synchronize the phase of a wireless power signal transmitted by the one or more adjacent charging holders.

15. The method of claim 13, further comprising:
sensing the presence of a portable electronic device on the first charging holder by determining a signal strength of a reflected infrared signal transmitted by the charging holder using an infrared transceiver.

16. The method of claim 15, further comprising:
transmitting an infrared phase synchronization signal to at least one adjacent charging holder, wherein the infrared phase synchronization signal provides a reference signal to synchronize the phase of a wireless power signal generated by the one or more adjacent charging holders.

* * * * *